United States Patent
Harris et al.

(10) Patent No.: US 12,307,479 B2
(45) Date of Patent: May 20, 2025

(54) METHOD AND APPARATUS FOR DIGITAL COMMERCE

(71) Applicants: Cooper Harris, Venice, CA (US); Xavier Monks-Corrigan, Venice, CA (US)

(72) Inventors: Cooper Harris, Venice, CA (US); Xavier Monks-Corrigan, Venice, CA (US)

(73) Assignee: Klickly, Inc., Santa Monica, CA (US)

( * ) Notice: Subject to any disclaimer, the term of this patent is extended or adjusted under 35 U.S.C. 154(b) by 0 days.

(21) Appl. No.: 16/237,602

(22) Filed: Dec. 31, 2018

(65) Prior Publication Data
US 2020/0193473 A1 Jun. 18, 2020

Related U.S. Application Data

(60) Provisional application No. 62/611,903, filed on Dec. 29, 2017.

(51) Int. Cl.
G06Q 30/02 (2023.01)
G06N 20/00 (2019.01)
G06Q 30/0242 (2023.01)

(52) U.S. Cl.
CPC ......... G06Q 30/0244 (2013.01); G06N 20/00 (2019.01); G06Q 30/0246 (2013.01)

(58) Field of Classification Search
CPC . G06Q 30/0244; G06Q 30/0246; G06N 20/00
See application file for complete search history.

(56) References Cited

U.S. PATENT DOCUMENTS

| | | | |
|---|---|---|---|
| 10,896,439 B1* | 1/2021 | Jogia | G06Q 30/0242 |
| 2006/0190354 A1* | 8/2006 | Meisel | G06F 16/951 |
| | | | 705/26.61 |
| 2006/0282328 A1* | 12/2006 | Gerace | G06F 16/248 |
| | | | 705/14.69 |
| 2012/0150667 A1* | 6/2012 | Salari | G06Q 30/0277 |
| | | | 705/14.73 |
| 2012/0166267 A1* | 6/2012 | Beatty | G06Q 30/0219 |
| | | | 705/14.46 |
| 2015/0052061 A1 | 2/2015 | Anderson et al. | |
| 2015/0100458 A1 | 4/2015 | Linden et al. | |
| 2015/0100459 A1 | 4/2015 | Linden et al. | |
| 2016/0098701 A1* | 4/2016 | Harris | G06Q 30/0267 |
| | | | 705/14.64 |
| 2017/0330219 A1* | 11/2017 | Feldman | G06Q 30/0243 |

OTHER PUBLICATIONS

"Google Shopping Ads: What We've Learned So Far" (Elesselly, Mona; published on Mar. 25, 2013 online at https://searchengineland.com/google-shopping-ads-what-weve-learned-so-far-152494) (Year: 2013).*

* cited by examiner

Primary Examiner — James M Detweiler
(74) Attorney, Agent, or Firm — Foundation Law Group LLP; JD Harriman

(57) ABSTRACT

The System provides a commerce engine for ingesting Brand data, presenting campaign choices to the Brand, providing Priority Score information, identifying consumers to target, dynamically selecting offers and environments via which to promote, optimizing conversion and fulfillment during a transaction, getting completed information from a consumer, transmitting necessary data to the Brand, and updating the purchasers data/profile.

14 Claims, 12 Drawing Sheets

FIG. 8 (PRIOR ART)

METHOD AND APPARATUS FOR DIGITAL COMMERCE

This patent application claims priority to U.S. Provisional Patent Application Ser. No. 62/611,903 filed on Dec. 29, 2017 which is incorporated by reference herein in its entirety.

BACKGROUND OF THE SYSTEM

Brands desire to engage customers, consumers, and users in the digital world. This is usually through some marketing message, ad, offer, consumer awareness activity and the like. Often a Brand will want to initiate a marketing campaign that can benefit the Brand, drive sales, create awareness, and move products and/or services. In the prior art, there are a number of challenges to initiating and obtaining conversions within a marketing campaign.

The Brand must provide product and/or service data to an ad system, along with creative (e.g. the ads themselves). This can lead to labor intensive efforts just to allow the serving of digital ads in the digital world. Often the effort must be repeated for various campaigns with various ad and marketing systems, adding to the cost and time of reaching consumers.

The Brand must create offers and determine which products to promote in a campaign. The Brand must try to determine what return on investment they are likely to receive from their campaign spend, and to optimize the Brand marketing budget to get the most bang for the buck. However, accountability in the digital world is often known only after a campaign is in progress, or even only after it has ended. There is a need to have greater predictability of expected performance and results when initiating a campaign.

Another challenge in prior art campaigns is identifying which offers or marketing messages to send to which consumers and on which devices. There is a need to allow dynamic optimization of marketing messages depending on the recipient of the message and even during viewing of the marketing message. This has been difficult and challenging in the prior art.

After the offer or marketing message has been presented to the consumer, there is still the problem of obtaining the necessary information from the consumer to finalize and fulfill the offer (e.g. purchase of the product and/or service, completion of a donation, signup for an event or newsletter, and the like). The functionality of many social networks, applications, ads, and interfaces has been limited by the inability to allow a user to easily initiate and complete a financial transaction. Many companies are using mediums like ads, social media, emails, and AR/VR, for example, to send advertisements and offers to users. If a user desires to purchase an advertised product, the user typically is redirected from the app or environment in which the user is operating. For example, if a user sees a compelling digital ad, upon interacting with this ad, the user will be redirected to another UI, usually via a new browser window, where the user is presented with the website of the merchant/advertiser, and where the user must go through a number of steps before completing a financial transaction for the product that was advertised. After the transaction, the user must manually return to the prior browsing experience that had been in use. A similar process is required when users encounter similar offers that may be non-monetary in nature, such as volunteering information or completing any other form of non-monetary call-to-action. Studies have shown that it can take ten or more clicks or page transitions to complete a transaction, particularly where the user does not have a pre-existing account with the merchant of the goods or services to be purchased.

Figure 8:
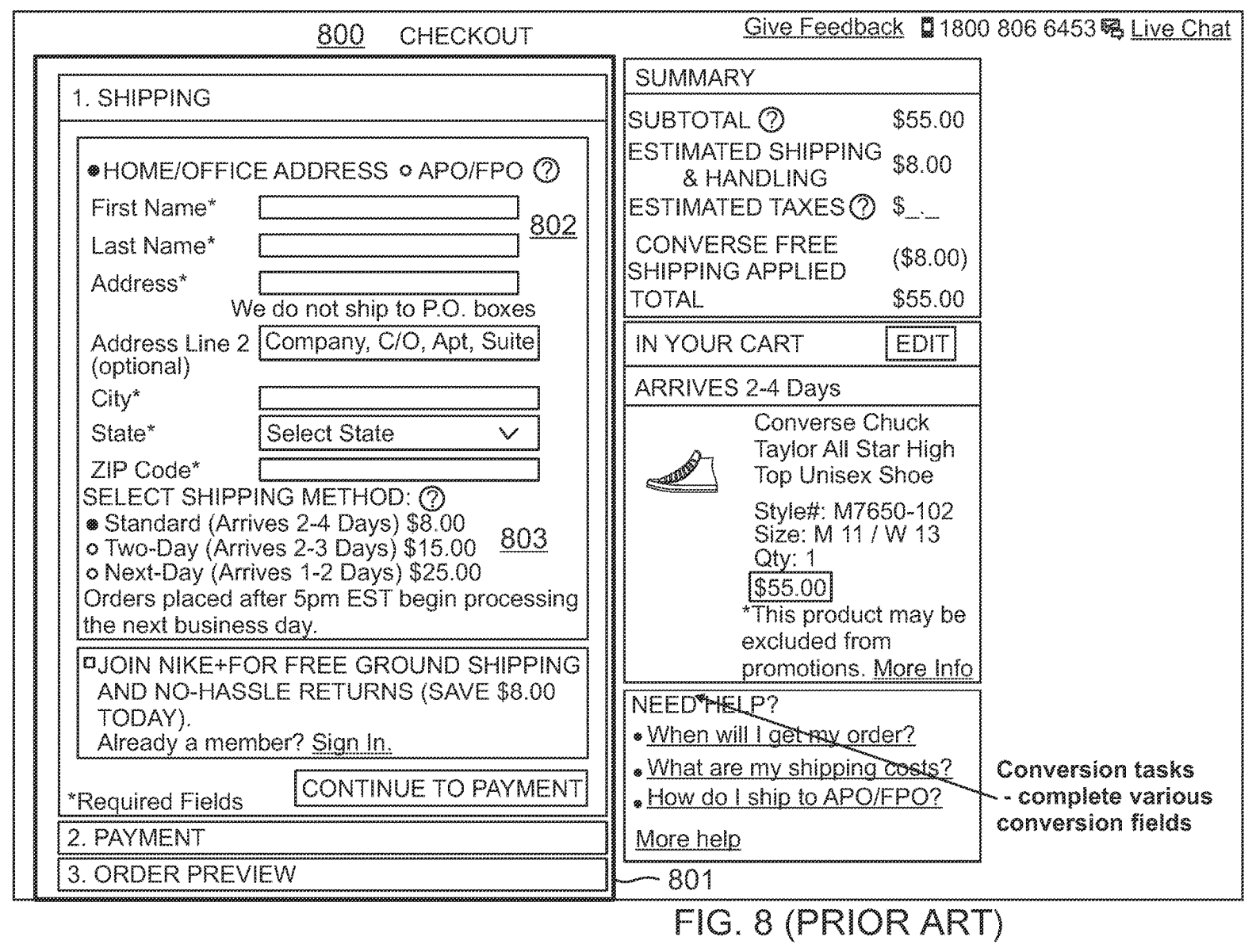

FIGS. 5-8 illustrates the prior art method of presenting a marketing message and the steps required for user action. FIG. 5 shows an ad 500 for a brand (Converse) with a call-to-action 501 ("Shop Now"). When the user acts on the call-to-action 501 by clicking on it, the user is moved from whatever site on which the ad appears to a page belonging to the brand itself, as shown in FIG. 6.

In FIG. 6, the user sees a page 600 with a plurality of products that the user might select, such as leather sneakers 601. The user clicks on sneakers 601 and is transported to page 700 of FIG. 7. On that page the user makes selections and completes conversion tasks in circled area 701 to select shoe size, color, and the like.

Payment is processed at checkout 800 on yet another web page, where the user must complete more conversion tasks 802 (address information) and 803 (shipping), before paying 801. Then the user must navigate back to the original environment in which they first encountered the ad 500, or at least close out the brand pages to return to the original location.

Transactions like these can be especially cumbersome where the user is not familiar with the conversion process of the brand presenting the marketing message, or does not have an existing account. While the mechanics of the conversion process are typically similar for both new and returning users, new users may not desire to have accounts at new merchants due to the complexity, risk and time required in creating and maintaining numerous individual accounts across multiple merchants, being even more reluctant to initiate a financial transaction as a result.

The conversion issue has a negative impact not only on consumers but extends to brands as well. In some cases, a desired action requires the completion of a series of conversion tasks, such as clicking on an ad, opening a new window, entering personal information, and clicking submit, in order to achieve the desired action of purchasing a brand's product. A user who performs all of the conversion tasks required to achieve the desired action is known as a converted user and the outcome as a conversion, while a user who performs only a portion of the conversion tasks required to achieve the desired action is known as a partially converted user and the outcome as a partial conversion. A key measure of success of brand's marketing is the number of conversions that are obtained in response to a given marketing message.

A disadvantage of present systems is that it requires brands to redirect users to a new website or destination to complete conversion tasks. That is, rather than incorporating their conversion tasks into the user's natural online user experience or even into the marketing message itself, the brand must disrupt this experience in order to enable completion of all of the conversion tasks required for conversion. This disruption is a barrier to many users in the digital world, particularly on mobile devices, and limits the success of a brand's marketing efforts and ultimately their bottom line.

SUMMARY

The system provides a commerce engine for ingesting Brand data, presenting campaign choices to the Brand, providing Priority Score information, identifying consumers to target, dynamically selecting offers and environments via which to promote, optimizing conversion and fulfillment during a transaction, getting completed information from a consumer, transmitting necessary data to the Brand, and updating the purchasers data/profile.

The system provides a method and apparatus for Brands to optimize conversions in their marketing messages, whether brand advertising, marketing, awareness, or any other type of promotions or offers. The system can interface with a brand in an intake step where the system can ingest offers and products that the Brand desires to offer to consumers. The intake step can normalize the specific Brand data through APIs and other interfaces so that the offers can be presented to a consumer in an effective format. The system does not require API or other connections, however, and can gather necessary brand parameters and data for product offerings via A.I. (artificial intelligence), scraping, and other methods.

The system provides an interface to the Brand that allows them to modify different metrics and parameters to determine how effective the campaign can be before and during the campaign. The system also allows the Brand to enter a desired Return on Spend (for example, "commission") into the system. Based on this entry, the other Brand selections and historical data, the system can assign a Priority Number to the brand that reflects the priority that the System will apply to serving the marketing messages of the Brand and/or to how the brand ranks in the System. The brand can modify elements that impact the Priority Number and see how the effectiveness of the campaign will change accordingly, due to having a higher priority in the System. For example, the Brand can manipulate their Priority Number by changing or adjusting various elements such as commission or compensation paid to the System, and see how the Priority Number, and thus the rank within the system and the effectiveness of the campaign, will change accordingly.

The system has the ability to identify consumers to target in the campaign to maximize the effectiveness of the campaign. This can be based on demographic information, past conversions of the consumer, search behaviour, purchases in the same or related fields of the Brand, and the like.

The System not only identifies the target consumer, but also can fine-tune an offer to the consumer to maximize the likelihood of conversion. That is, the System has the capability to dynamically generate and/or modify offers to a particular consumer on a particular device in near real time, even while a marketing message is being served to the user, or even after the fact. This allows a greater likelihood that the user will convert.

After each engagement with a consumer, the System obtains any completed information from the consumer, transmits necessary data to the Brand, and updates the profile of the consumer.

In one embodiment, after a conversion has been achieved, the System allows multiple conversion tasks, including financial transactions, to be presented and engaged "in-ad" without leaving the site on which the ad or marketing message is presented. The System can map to the pre-existing conversion tasks of a Brand to allow a user to respond to a call-to-action without navigating away from their current browsing experience. The System allows purchases and other conversion tasks to be completed within the ad. The System works within various digital UIs such as ads, emails, social media platforms, and VR/AR experiences. The System has the capability to work with direct or programmatic ads. The System has intelligence to optimize an ad for a particular user and to even replace an ad or offer during load if one or more other brands, ads or offers would be more optimal for the System, brand and/or user. The System also provides the capability to present a plurality of ads and/or conversion options to a user within an ad. The System has the ability to estimate the likelihood that a given brand's marketing message will be successful, and to leverage this estimate to influence the compensation offered by the brand to the System.

The System can also generate a series of offers to a consumer to "build up" to a conversion. This could comprise a marketing message regarding product consideration, email follow up, request personal information (e.g. address) from a target, and use this chain to drive a purchase or other desired conversions over multiple engagements with the target. The System could tailor the progression to the behaviour of the target consumer in response to individual steps in the progression, with the system using a decision tree and/or AI to move the customer from awareness, to familiarity, to consideration, to purchase, and to loyalty.

BRIEF DESCRIPTION OF THE DRAWINGS

FIG. 8 is an example of a Brand checkout process with several conversion tasks after selecting parameters in FIG. 7.

DETAILED DESCRIPTION OF THE SYSTEM

The System provides a method and apparatus for creating and implementing a campaign for a brand. The System is used to create a digital advertising and marketing campaigns for a brand. The System allows brands to migrate their conversion tasks, including user inputs and payment processing, to third party environments without needing to have prior knowledge of the destination website. The System provides enhanced ability to obtain product information from a Brand, to provide realistic performance expectations to the Brand, to select offers, products and environments to promote, to dynamically optimize offers to specific users, to get necessary information from the consumer in an efficient manner, to transmit necessary data to the Brand, and to update consumer profiles to optimize future marketing messages and offers to the consumer.

System Overview

Figure 1:
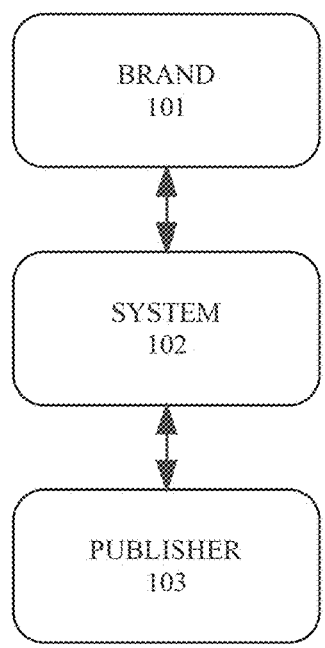
FIG. 1 is a block diagram of the relationship between a brand, publisher, and the system in one embodiment.

FIG. 1 is a block diagram illustrating the relationship of the system with a brand, publisher, and website. A Brand 101 (merchant, advertiser, publisher, seller, individual proprietors, non-profits, 501C4s or any organized entity wishing to promote calls-to-action in the digital world) desires to engage potential customers in the digital world through marketing messages (e.g. ads, promotions, brand awareness messages, sponsorships, coupons, donations, and the like). These marketing messages typically include a call-to-action, such as an image or instruction, which is designed to entice the user to perform a desired action. Examples of desired actions might be reading more about the advertised product or service, purchasing the product or service, providing the brand with personal information via a survey, and the like. The Brand 101 provides a marketing message with one or more conversion tasks included.

The Brand 101 interacts with the System 102 where, through a Brand intake process, the offers and conversion tasks are converted into a distributable format. In one embodiment, the Brand 101 does not need to modify their conversion tasks in any manner, and can use them in the way in which they are accustomed. The System 102 normalizes the conversion tasks to a suitable format and forwards the converted marketing message to a Publisher 103 where the normalized marketing message can be served on a variety of platforms. Engagement with the distributable conversion tasks by a user is sent back to the System 102 when the marketing message is served, and the System 102 provides the proper response and serves any data that is appropriate for the conversion task.

Figure 2:
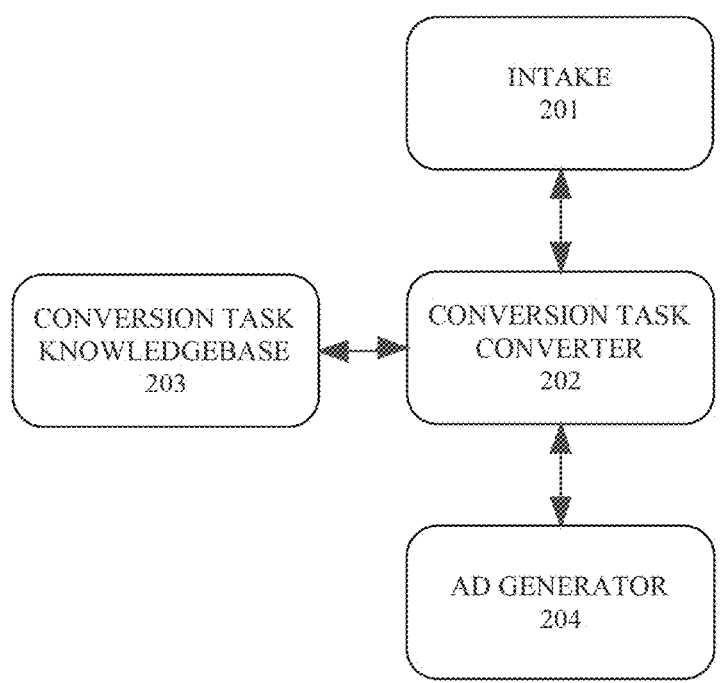
FIG. 2 is a block diagram of one embodiment of the system.

FIG. 2 is a block diagram illustrating the System 102 in one embodiment. The system 102 includes Intake 201 to receive data and content from the Brand 101 who wishes to take advantage of the system. The Brand 101 may provide "creative" along with links or connections to conversion tasks required by the Brand 101 that are to be included with the ad. In other cases, the Brand 101 may just provide conversion tasks and the system will automatically produce creative using pre-set templates that the system generates. In other cases, the Brand 101 may merely provide offers or products for the system to promote, and the system will automatically produce conversion tasks. One example of this is product listing ads that can be automatically generated. Intake 201 analyzes the ingested content from the Brand 101 and identifies and isolates any conversion tasks.

Those conversion tasks are then provided to Conversion Task Converter 102 where the conversion tasks are converted into a distributable format that will enable conversion within the ad or marketing message. The Conversion Task Converter 202 relies on a Conversion Task Knowledgebase 203 that is populated with conversion task identifiers (or other meta data that can be used to identify the type and/or owner of a conversion task to enable it to be found in the database and/or knowledge base) as well as optimized distributable conversion tasks for each type of conversion task. The data for the Conversion Task Knowledgebase 203 may come from prior ads and messages, from the Brand 101 itself, or from any suitable source. The ad is then provided to the Ad Generator 204 to turn the ad into a servable instance. The Ad Generator may generate multiple instances of the ad if necessary for use on different platforms and environments, such as mobile, desktop, tablet, web-based, social media based, messaging based, AR/VR and the like.

Conversion Tasks

The system contemplates a plurality of additional Conversion Tasks within an ad with multiple calls-to-action. These additional conversion tasks allow the viewer to undertake multiple actions that will still optimize the chance of an eventual purchase in response to the ad or marketing message. For example, the ad may have a "Save" call-to-action, with associated conversion tasks, so that the user can view the ad at a later time. The ad may have a "Share" call-to-action that allows the viewer to share the ad with one or more other people. The conversion tasks may include some incentive for sharing, such as some percentage off the purchase price or additional goods or services in return for the viewer sharing the message. There may also be a call-to-action that allows more exploration of the marketing message, pulling additional details or other data within the ad itself, or by allowing the user to be redirected to the brand's website should they choose.

Research has shown that consumers vary purchase types depending on the device on which an ad is viewed, the price of an item, and/or whether the purchase is a repeat purchase or a new purchase. Some consumers tend to do more research on more expensive items in a desktop environment and are more likely to make impulse and/or lower priced purchases on a mobile device. By providing in-ad exploration and ad saving capabilities, the usefulness of advertising on mobile for products typically purchased on desktops becomes meaningful.

Brand Intake

Figures 11, 12:
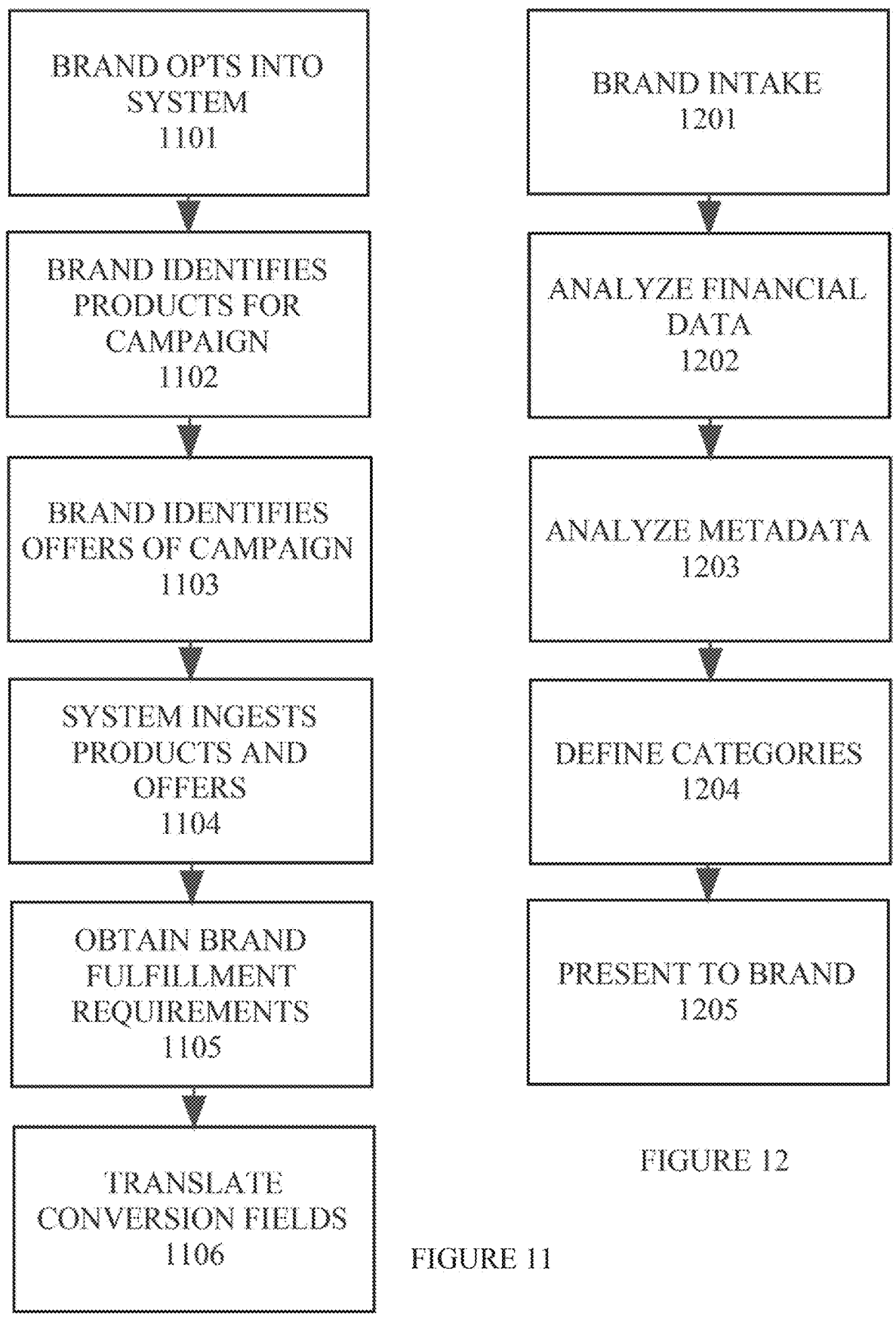
FIG. 11 is a flow diagram illustrating Brand intake in an embodiment of the system.
FIG. 12 is a flow diagram illustrating the generation of categories by the System to present to the Brand.

FIG. 11 is a flow diagram illustrating the operation of Brand Intake 201 of FIG. 2. In one embodiment, Brand Intake 201 comprises acquiring marketing message information from the Brand 101 as well as identifying the data required from a user/consumer for a transaction associated with one or more of the marketing messages of the Brand 101. At step 1101, a Brand 101 elects to use the System 102 for a campaign. A campaign is the publishing or one or more marketing messages on one or more platforms with a desired goal (e.g. brand awareness, drive sales of one or more products or services, to generate leads, and the like). At step 1102 the Brand 101 identifies those products and/or services that are to be part of the campaign. At step 1103 the Brand 101 identifies the particular offers that are to part of the campaign (e.g. pricing, discounts, time based offers, and the like).

At step 1104 the System 102 ingests the products and offers of the Brand 101. This step may be accomplished in a number of ways, including through customized APIs, through a product feed (e.g. a file comprised of a list of products and attributes of those products organized so that each product can be displayed, advertised, or compared in a unique manner), through artificial intelligence (AI) systems, and scraping the Brand site and making correlations between fields that are mapped, to determine what the fields of the Brand 101 are and how they can be mapped to System 102 fields.

The data fields obtained or generated by the System 102 might include SKU, product number, images, title (name), description, variant options (size, color, and the like), quantity, groupings, custom variations, price, discounts, user reviews, and the like.

At step 1105 the system obtains the requirements of the Brand for fulfillment of a Brand offer. This may include a consumer/user name, email address, payment source, shipping address. At step 1106 the system 102 translates the Brands consideration and checkout experiences into readable conversion fields of the System 102. This may be done via 1:1 matching, AI, predictive analysis, historical data tables, directly from the Brand, and the like.

In one embodiment, the System is described with the example of conversion fields, which are readable fields that are readable fields within the user interface that accept whatever input is necessary from the consumer to complete a successful conversion. However, the System can also operate with conversion tasks. A conversion task is an operation that is related to or is a step in the process of a conversion by a consumer. In the environment of AR or VR, a conversion task may take the place of a conversion field and may be in the form of a gesture, movement, focus, hold on an image, or any suitable stimulus that can be interpreted as a conversion activity. In presenting examples of the System, field and task are used interchangeably.

At this point the System 102 has most of the information it needs to run a campaign for the Brand 101. The System 102 then provides an opportunity for the Brand to define priority parameters to optimize the campaign for the Brand.

Priority Assignment

The System handles the campaign for the Brand and, in one embodiment, is paid on a commission basis based on conversions in response to the campaign. The System may be handling multiple campaigns for multiple Brands. The System collects consumer information from a plurality of sources, including the campaigns run by the System and uses that information to determine the priority it will assign to any one Brand, marketing message, and/or campaign.

In one embodiment, the System will collect product views, product clicks, options selection, add to cart, purchases, information about what similar consumers have viewed/clicked/selections, cart adds, purchases, and the like and provide it to machine learning algorithms to determine how likely a conversion would be for the Brand.

Once the Brand 101 data has been ingested by the System 102 (including the identification of offers by the Brand at step 1103), the Brand 101 determines certain parameters that will affect the effectiveness of the campaign. In one embodiment, one of the parameters is the compensation paid to the System 102 by the Brand 101 for successful conversions.

Figure 10:
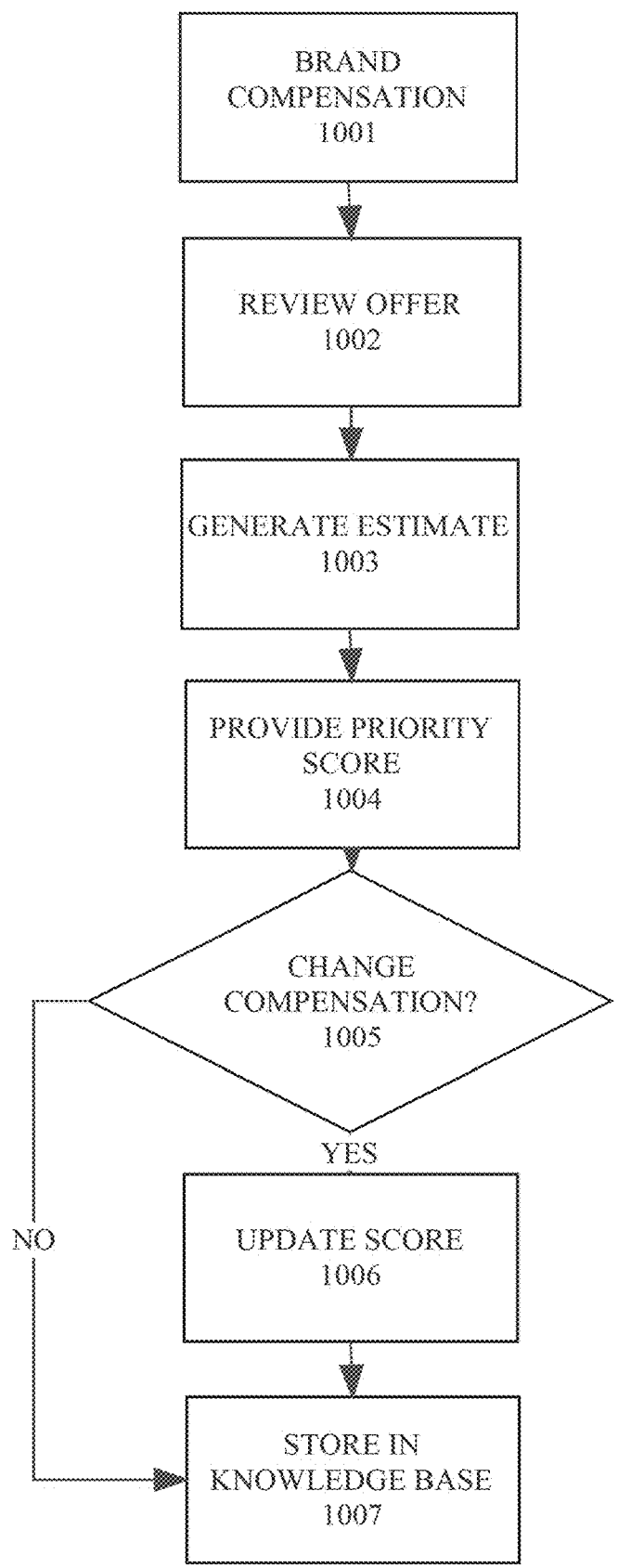
FIG. 10 is a flow diagram illustrating the system's initial decision of which brand's marketing message to serve.

FIG. 10 is a flow diagram illustrating the operation of the system that enables an initial decision around which brand's marketing message to serve. At Step 1001, the Brand 101 may offer the System 102 some form of compensation to serve the brand's ads. Compensation might be in the form of a fee for every time the Brand's ads are shown, a fee for every time the Brand's ads are clicked or engaged by a user, or a fee for every time a sale or order is achieved as a result of the system showing the ad to a user, or similar.

In Step 1002, the System 102 reviews the brand's offered compensation and assigns a priority score and presents it to the Brand 101 at step 1003. The Priority Score represents the priority that the System 102 will use to display the brand's marketing messages. In one embodiment, where the Brand's offered compensation includes a fee for every time a sale or order is achieved as a result of the system showing the ad to the user, the System 102 may review the Brand's conversion history (such as the number of historical conversions, frequency of historical conversions, conversion types included in the offer, and the like) and the offered compensation, and compare this data to the conversion history and offered compensation of other Brands in order to determine the likelihood and amount of compensation due the System 102 versus other brands. For example, a Brand with an estimated 30% conversion rate paying a commission of $10.00 per sale is worth $3.00 per ad. A Brand with a 10% conversion rate paying a commission of $100.00 per sale is worth $10.00 per ad. The System may assign a higher Priority Number to the Brand with the higher per ad value. In addition to this, the System uses other data including, but not limited to, weighting for high priority Brands, A/B tests that might select lower or higher performing products, and the like.

With this information, the system can generate a "Priority Score" that is used to let the Brand know how much priority the System will give to the marketing messages of the Brand. In some cases, it acts as the "place in line" of the marketing message of a Brand compared to other marketing messages of other Brands that may be suitable for serving to a particular consumer.

In one embodiment, the Priority Score is a percentile from 0 to 100 that shows the percentage of other Brands that will have better results than Brand 101 based on the compensation selected by Brand 101 at step 1001. In addition, in one embodiment, the priority score is given as a range (e.g. from 0 to $60^{th}$ percentile) to the Brand 101. It should be understood that the priority score represents the efforts that the System will use in promoting the campaign. It does not necessarily directly correlate to conversions and impressions. For example, if a Brand has a Priority Score of zero, that brand will not get pushed by the System but it may still get conversions when pulled by a consumer (e.g. though a web search for the Brand or products of the Brand).

In one embodiment, the Priority Score may be based on historical performance, sales by product, new customer sales, returning customer sales, timing of the sales, seasonality, site traffic, page visits (e.g. which pages are being visited).

At step 1004 the System 102 provides the Priority Score to the Brand 102. At decision block 1005 it is determined if the Brand changes the Priority Score. In one embodiment, a dashboard allows the Brand 101 to see the Priority Score and to change the compensation to see the new Priority Score that would result from that change (whether up or down). This allows the Brand to optimize its spend and obtain campaign results accordingly.

If the Brand has changed its compensation or commission parameters at step 1005, the system updates the Priority Score at step 1006. After step 1006, or if the Brand has not changed its Priority Score at step 1005, the system stores the Priority Score in the System Knowledge Base at step 1007.

In one embodiment, the Brand compensation is a commission representing a percentage of a conversion that will go to the System for a completed conversion. In other embodiments, the Brand 101 may also select a dollar amount commission for each new customer acquisition. These commissions are used to define a Priority Number. In one embodiment the Brand can move a slider from 0 to 100% commission and see how the Priority Score changes accordingly. In one embodiment, the Brand 101 may set a commission percentage of greater than 100% of a conversion (e.g. sale) in order to encourage customer acquisition. In another embodiment, the commission is limited to a maximum of 100% but the Brand 101 can define a separate new customer commission amount expressed as a dollar amount for new customer acquisition.

Product Selection

After Brand Intake, the System 102 can analyze the Brand's offer, products and/or services and populate and define categories and fields that describe the products in a way that allows generation of a campaign to be done efficiently. For example, the System 102 may define fields including "Entire Catalog", "Best Sellers", "Specific Collection", "Specific Product Types", "Specific Products" and the like. This sorting and characterizing is accomplished by using the sales data and metadata associated with the Brand products to define collections and related products, define top sellers, and the like. A Brand can always define specific offers and products for the campaign using the System. In one embodiment, the System will select products and offers that will result in the highest Priority Score.

FIG. 12 is a flow diagram illustrating the operation of the System in selecting products and offers in an embodiment of the system. At step 1201 the System performs the Brand intake. At step 1202 the System analyses the financial data of the Brand data to identifies sales ranks of the products and/or services of the Brand. At step 1203 the System analyzes the metadata associated with the Brand data to identify collections, age groups, styles, and the like. At step 1204 the System may use the analysis to populate standard categories that the System may use to easily generate campaigns for the Brand. At step 1205 the System presents the populated categories to the Brand for review and selection. In one embodiment, the Brand may define its own categories and provide them to the System.

Promotions

Figure 13:
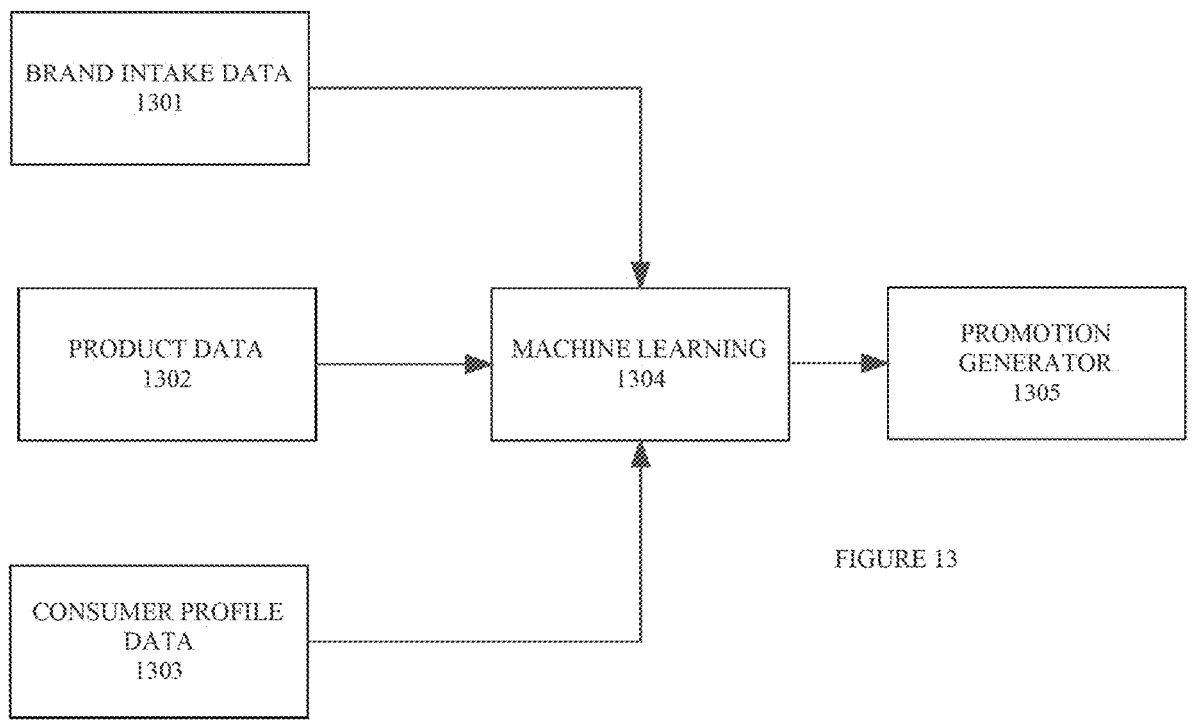
FIG. 13 is a diagram of the recommendation engine of the System in an embodiment.

Once the products to be offered have been determined, the System uses historical data (its own and other available data) to determine the promotions and offers that will have optimized conversion success. FIG. 13 is a block diagram illustrating an embodiment of this part of the System. Block 1301 is the Brand intake data, including products, pricing, sales data, and the like. Block 1302 is product data that the System has from its own historical data, from third party sources, product clicks, cart selectins, and the like. Block 1303 is a database of consumer profiles that the System has generated based on conversions and other transactions that it has accumulated over time from other campaigns. The information from these databases is provide to machine learning block 1304 where it is analyzed and it is determined which products of the Brand would generate suitable conversion rates and compensation. This analysis is provided to the Promotion Generator 1305 which creates ads, marketing messages, and/or offers that can be served to a consumer. This analysis and generation is an ongoing process as the information in the databases is updated on a regular basis to provide accurate information and to generate optimized offers and promotions.

Offer Optimization

In Internet marketing, a conversion is defined as "the point at which the recipient of a marketing message performs a desired action." The action may involve one or more steps, and can take the form of a click, voiced command, data entry, URL selection, a mouse hover, and the like in response to a call-to-action. The call-to-action may be an invitation to purchase, a URL link, a graphic shape or button, an inquiry, an opt-in, a form field, and the like in an ad, promotion, marketing spot, brand awareness message or any other interface where a specific action is implied or desired. In the present application, the different steps required to complete a desired action in response to a call-to-action are referred to herein as "conversion tasks". A brand or advertiser can define a plurality of desired actions, typically on the website of the brand where the brand has full control over content, programming, and interface.

The present application provides a system and method for providing a plurality of conversion tasks in addition to purchase tasks in an ad, and to allow it in both direct ads and programmatic ads. The system takes advantage of the fact that a user may have already opted in to the present system to aid in auto-completing certain conversion tasks (such as entering personal information into form fields). In addition, the system can provide better targeting because the system already has permission and knowledge of its own users.

A direct ad is an ad that is embedded in a publisher's site or is served onto the site using, for example, a platform such as DoubleClick for Publishers. A direct ad can be optimized because the destination site is known in advance and the environment and other metrics are known in advance.

By contrast, a programmatic ad is an ad served by a demand based ecosystem, such as a Demand Side Platform (DSP). A programmatic ad is not necessarily intended for a specific site but is served when certain conditions occur, either demographically, based on keyword presence, or some other metric that the provider of the programmatic ad has determined represents conditions under which the ad is to be displayed. In some cases, programmatic ads compete for ad space in a real-time bidding (RTB) environment. RTB is a micro-auction with other programmatic ads that have the same or similar conditional metrics. The auctions take place in the time it takes a webpage to load and are often implemented through ad exchanges or Supply Side Platforms (SSP). In other cases, a programmatic ad may have guaranteed ad impressions arranged in advance from specific publisher sites. This is referred to as programmatic direct ad purchasing.

The ability to modify or enhance the functionality of a programmatic ad is more complex because the environment and ecosystem of the ad is not controlled by the system herein, and is not necessarily known in advance. The present system makes third party cross origin calls within the constricted space of the ad and allows other dynamic optimization of ads in the campaign.

Figure 4:
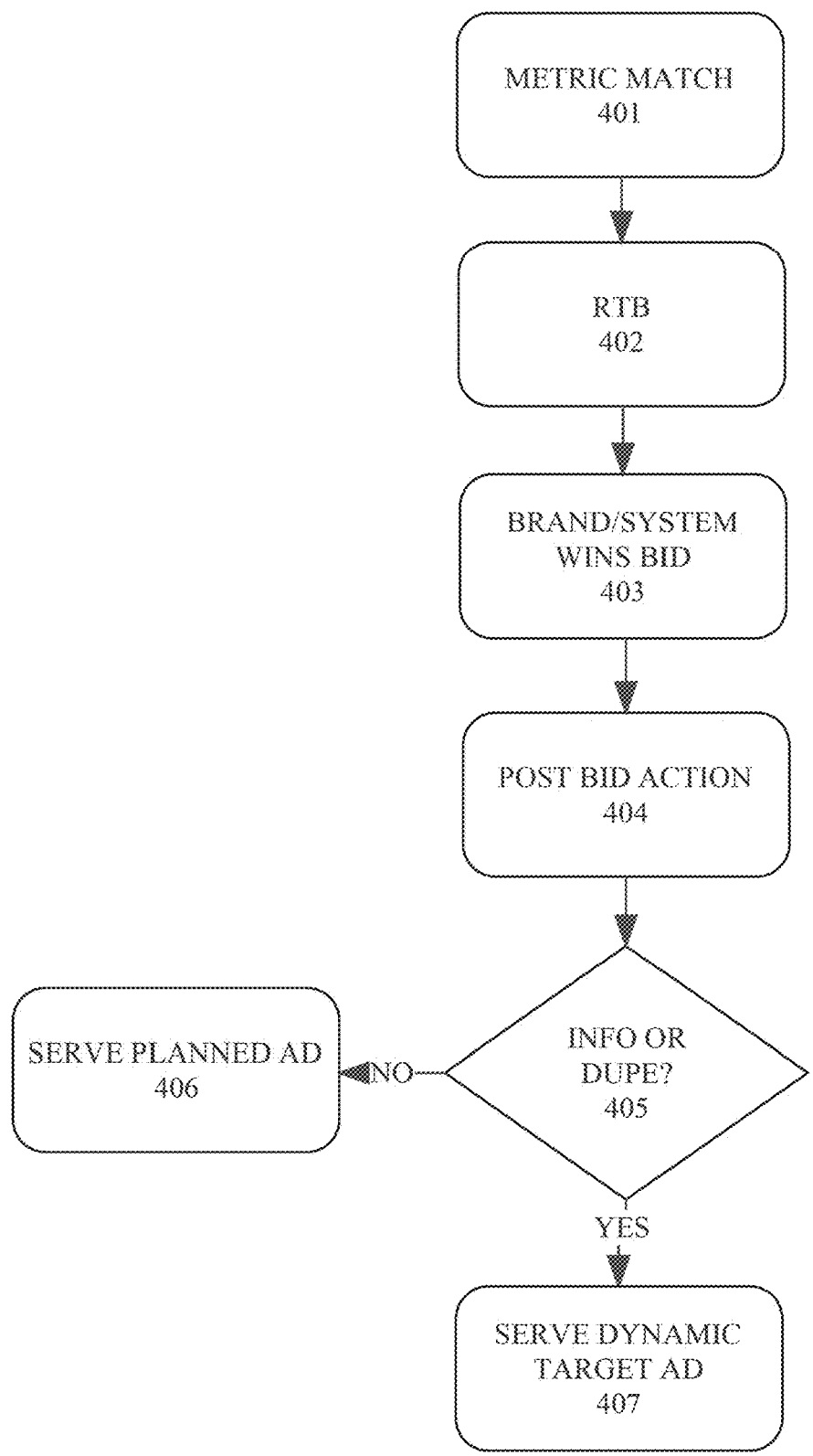
FIG. 4 is a flow diagram of the serving of a programmatic ad in one embodiment of the system.
Figure 5:
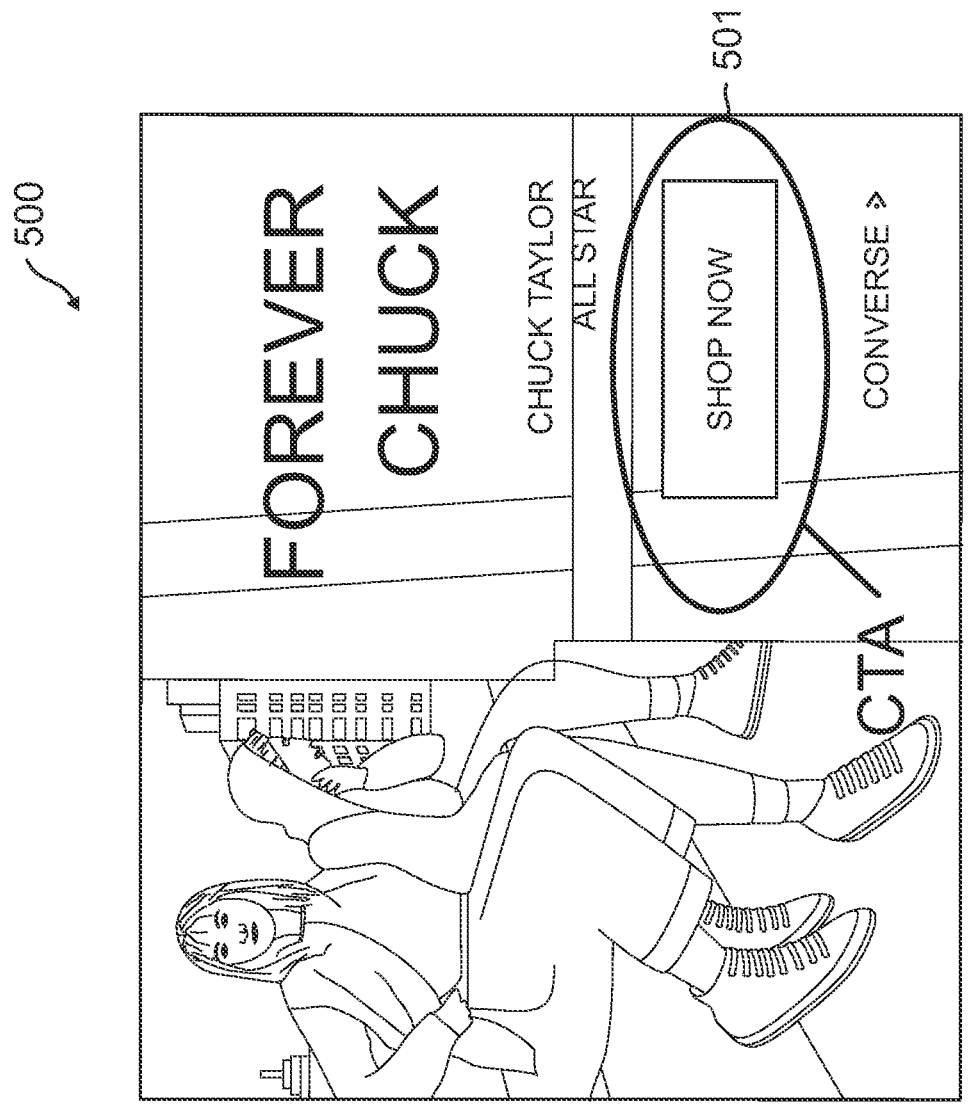
FIG. 5 is an example of a prior art marketing message with a call-to-action.
Figure 6:
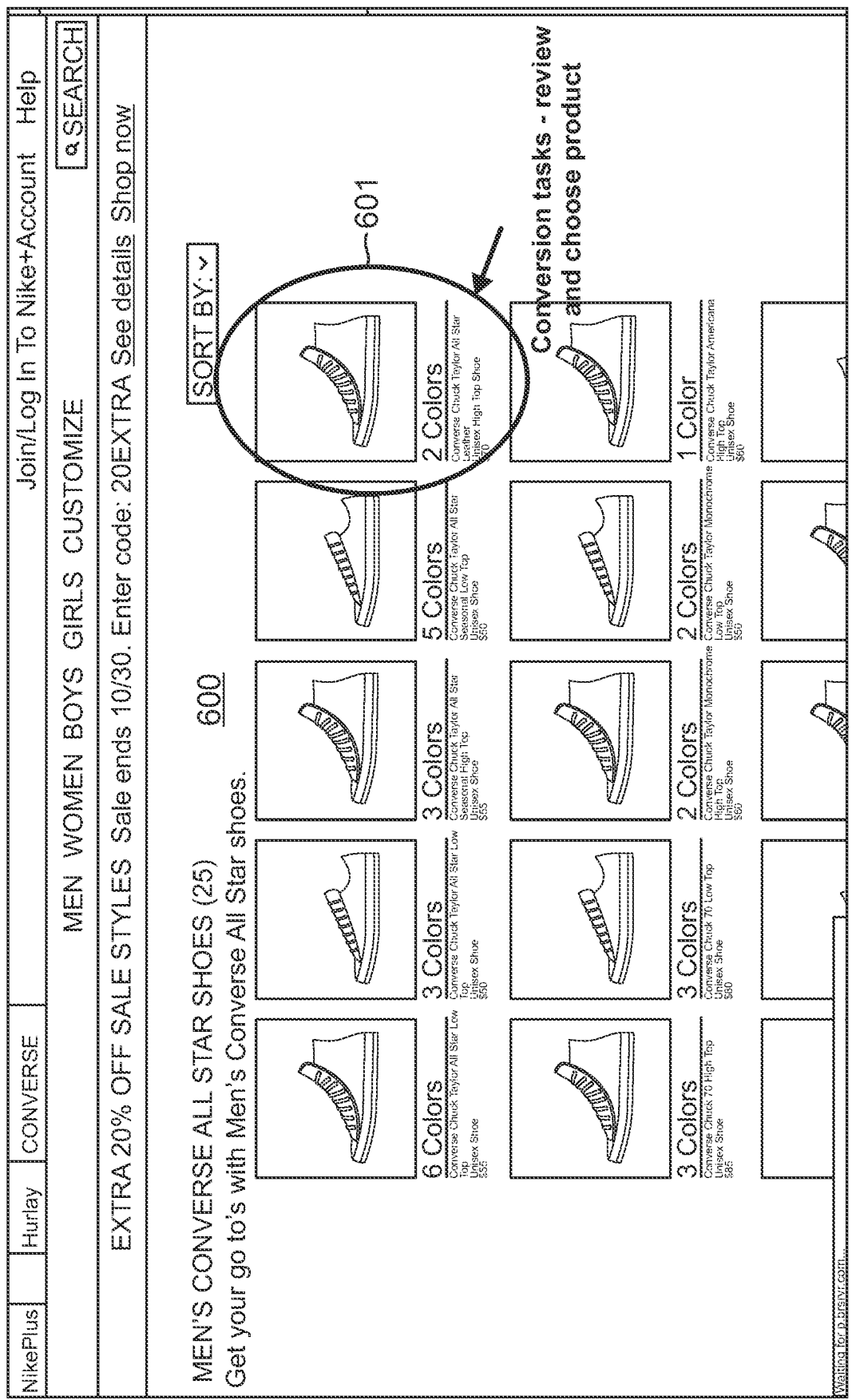
FIG. 6 is an example of a Brand page to which a user is taken after acting on the call-to-action of FIG. 5.
Figure 7:
FIG. 7 is an example of a Brand page after selecting a product in FIG. 6.

The serving of programmatic ads in one embodiment is illustrated in FIG. 4. At step 401 a condition is detected that matches the metrics for serving an ad as defined by a Brand 101 or the system itself. This may be demographic information related to a type of user, presence of key words, prior search history, cookie information, and the like. At step 402 the RTB bidding process takes place. This is all accomplished while the web page is loading. At step 403 the Brand 101 or the system wins the bid. (The system may bid on behalf of multiple brands and determine allocation to one or more of the brands based on Priority Score, metrics, and content, to maximize effectiveness).

At step 404 the system initiates post-bid actions. At decision block 405 it is determined if there is information that could impact the serving of the programmatic ad or if the viewer has already purchased the item that is the subject of the ad. For example, there may be information about the user known by the System that could be used to modify the ad to be served or to provide additional calls-to-action, additional marketing messages, and the like. Similarly, the viewer of the ad may have already purchased the item in the ad or marketing message. If there is either user information or if the ad duplicates prior user purchases, the system proceeds to step 407 and serves one or more dynamically determined targeted marketing messages. These messages may be from a plurality of possible marketing messages from the same advertiser or from other advertisers that are meant to be used in this exact situation. There may be a scoring process based on the metrics associated with the viewer to determine which of a plurality of possible ads should be presented at this time. In one embodiment, the system uses a recommendation engine to generate an appropriate product for the user. These marketing messages could scroll within the ad space loaded on the page as result of the ad win in the RTB process and might be presented in a variety of templates including multi-products units, refreshing units, carousel units, or the like.

The System 102 can also combine products from more than one Brand to maximize conversion for both Brands. The System may determine that a customer who is looking at a particular product will often buy another product that is used with the first product. Sometimes these products are made by different Brands. The System has the ability to offer both products or any combination of Brands and products to the customer, which can help drive the successful conversion of one or both products.

Consumer Information

An important step for the Brand 101 and System 102 is obtaining consumer information in an efficient manner that increases the likelihood of conversions. In one embodiment, this is accomplished by providing a payment system through the System 102. In the prior art, a brand would provide a marketing message in some medium, such as the internet, social media, ad, email, text message, Instagram, tweet, and the like, with some offering of one or more products and services, with a URL link to bring the viewer of the message to the website of the brand, or with a partial set of conversion tasks, but which is not enough to complete the desired action. However, users often avoid clicking on such promotions or ads because the user does not want to leave their current viewing experience or the website they are on. In addition, the user may be encouraged to be more impulsive and spontaneous with respect to an ad if the ad presented more conversion choices to the user, such as the option to buy, to set a reminder, or to save the marketing message for later engagement. One or more of the choices may have some interest to the user and a conversion might take place but for the fact that the user does not want to leave their current website.

In addition, attempting to provide certain conversion tasks on third party sites may be difficult for brands due to a variety of limitations on the brands' part, including: not having a relationship with the third party destinations, not owning or operating said third party sites, not controlling the computing and operating parameters of third party sites, not having the ability to generate successful cross-origin calls from within an ad, not being compatible with other platforms and ecosystems that enable ads to be delivered to third-party sites, not having the ability to recognize users of other Brands or users of the System who are not known to the Brand, and not having ability to auto-populate certain input fields with user information away from their own site. Privacy laws prevent Personal Identifiable Information (PII) from being shared with parties without the appropriate permission or opt-in of the person. This makes conversion tasks on third party sites more difficult to complete for a user, and makes it less likely that the user will respond to any call-to-action.

One method of providing the ability to complete a financial transaction within an ad is described in U.S. patent application Ser. No. 13/873,155 published as Publication Number 2016/0098701 entitled "Method and Apparatus For Transaction Management" filed on Oct. 1, 2015, which is incorporated herein by reference in its entirety. The system replaces or extends the brand purchase conversion tasks, acting as an interface between the user and the brand. For the user, the system may appear and be associated with a plurality of brands, allowing the user to complete financial transactions for brands without the user needing to register with the brand itself. This increases the likelihood of purchase conversions for the brand.

Figure 3:
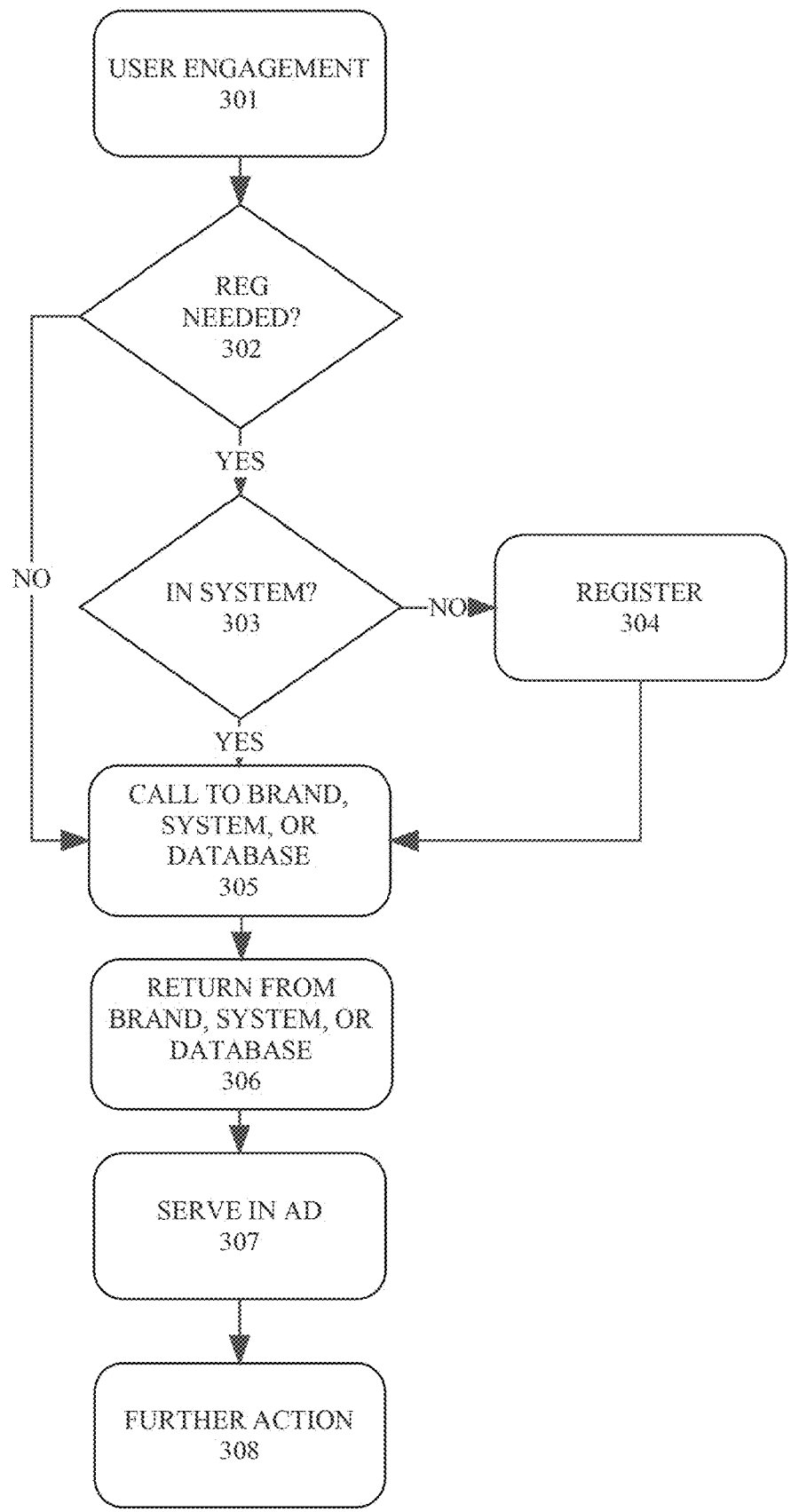
FIG. 3 is a flow diagram of an interaction with a conversion task in one embodiment of the system.

FIG. 3 is a flow diagram illustrating an example of the operation of the system when a user engages with an ad or marketing message using the system. At step 301 a user engages with a marketing message and responds to a call-to-action by completing one or more of the conversion tasks (including both tasks completed consciously by the user and tasks completed automatically by the user's device, such as an automated response in which the user's device might provide location and IP information about the user). At decision block 302 it is determined if the response requires the user to be a registered user of the system. For example, the call-to-action may simply be a request for more information, a request to share the message, or some other action that does not require the user be registered in the system.

If registration is required, the system proceeds to decision block 303 to determine if the user is a registered user of the system. If not, the system proceeds to a simplified version of a sign-up process at step 304, such as is described in FIG. 1 of U.S. patent application Ser. No. 13/873,155 and the user is registered.

After step 304, or if the user is registered at step 303, or if registration is not required at step 302, the system proceeds to step 305. At step 305 the System 102 sends a call to the Brand 101 for information, data, confirmation, and the like that is needed to enable the consumer to convert. This information and data could include product colors, sizes, shipping choices, accessories, and the like. In one embodiment, this information may be available from the System 102 and at step 305 the System itself or the database might provide that information without a call to the Brand. The System 102 receives any required response from Brand 101 at step 306 and serves the information within the ad at step 307. In one embodiment, System 102 itself may have stored information, data, metadata, or the like to provide a response to the call-to-action without a call to the Brand 101. In another embodiment, the ad itself may have code to provide a response to the call-to-action without a call to the Brand 101 or System 102.

The call-to-action response at step 301 also initiates the recommendation engine in the System 102. The System 102 at step 308 may modify the ad as noted above, serve one or more follow up messages and/or ads in response to the user's interaction with the call-to-action, or the like. This follow-up can be based on personal information that the System 102 has about the registered user or on demographic and other metrics based on, for example, the IP address of the user engaging with the ad or message, or based on page content (e.g. content, temporal data, and the like). In one embodiment, the System also provides additional and/or modified marketing messages to the user after a completed conversion.

Figure 9:
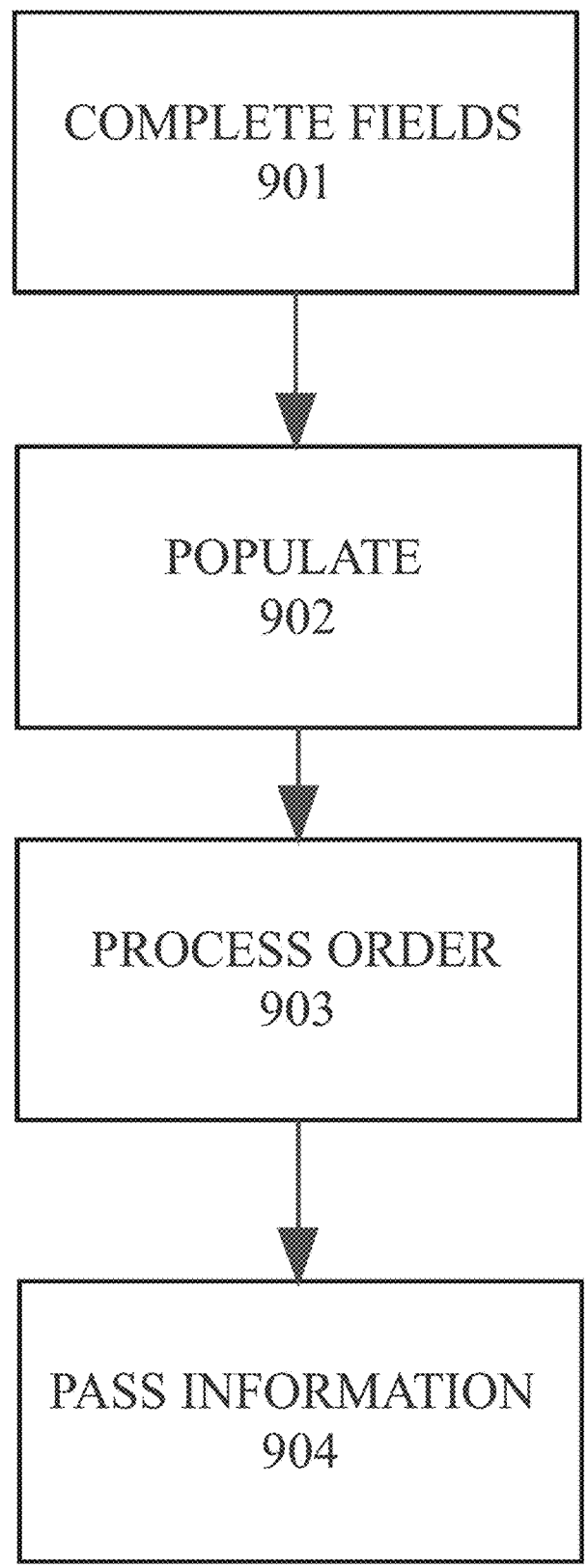
FIG. 9 is a flow diagram illustrating a conversion process and payment in an embodiment of the system.

FIG. 9 is a flow diagram illustrating the payment process in one embodiment of the system. At step 901, the user completes any conversion tasks in the marketing message (e.g. product selection, color, size, and the like) and selects the option to pay. For a user already registered in the system, the system retrieves the user's purchase data at step 902, based on information and authorizations in the user profile. At step 903 the system processes the payment transaction itself on behalf of the Brand. At step 904 the system may send the information directly to the Brand accounting system or may generate a purchase order and payment to the Brand so that the order can be fulfilled.

Transmit Data to Brand

The System returns conversion data to the Brand and uses the data to update the Systems Priority Score Generator to improve efficiency and to optimize the campaign. This information could be returned to the Brand in a reverse of the Brand Intake process, for example through an API that will de-normalize the data from the System format to the Brand format, through a web page.

As data is acquired by the System and the Brand, the Priority Score is updated to reflect real world results. The Priority Score might be lower or higher than the original value of the Priority Score. The System will provide the updated Priority Score to the Brand, who may decide to modify compensation to raise the Priority Score. In one embodiment, the Brand may pre-approve an automatic modification (e.g. increase) in compensation and/or other metrics to maintain the Priority Score at a desired level.

Update Consumer Profile

When the consumer is already part of the System purchase ecosystem, or if the consumer elects to join the System during the purchase or conversion, the System updates the profile of the Consumer to allow for better targeting and ad serving in future transactions, as well as to provide follow up communications, and to intelligently serve ads and combinations of Brand products in the future. The System may collapse data from multiple consumer records (e.g. multiple Brand information, emails, Facebook, IP address, and the like) to define one user from multiple profiles. The System will also update relevant data in the profile when learned (clothing sizes, shipping choice, color preference, and the like). The System will also use machine learning or AI to make intelligent guesses regarding a consumer (e.g. predicting gender, age range, and the like).

Figure 14:
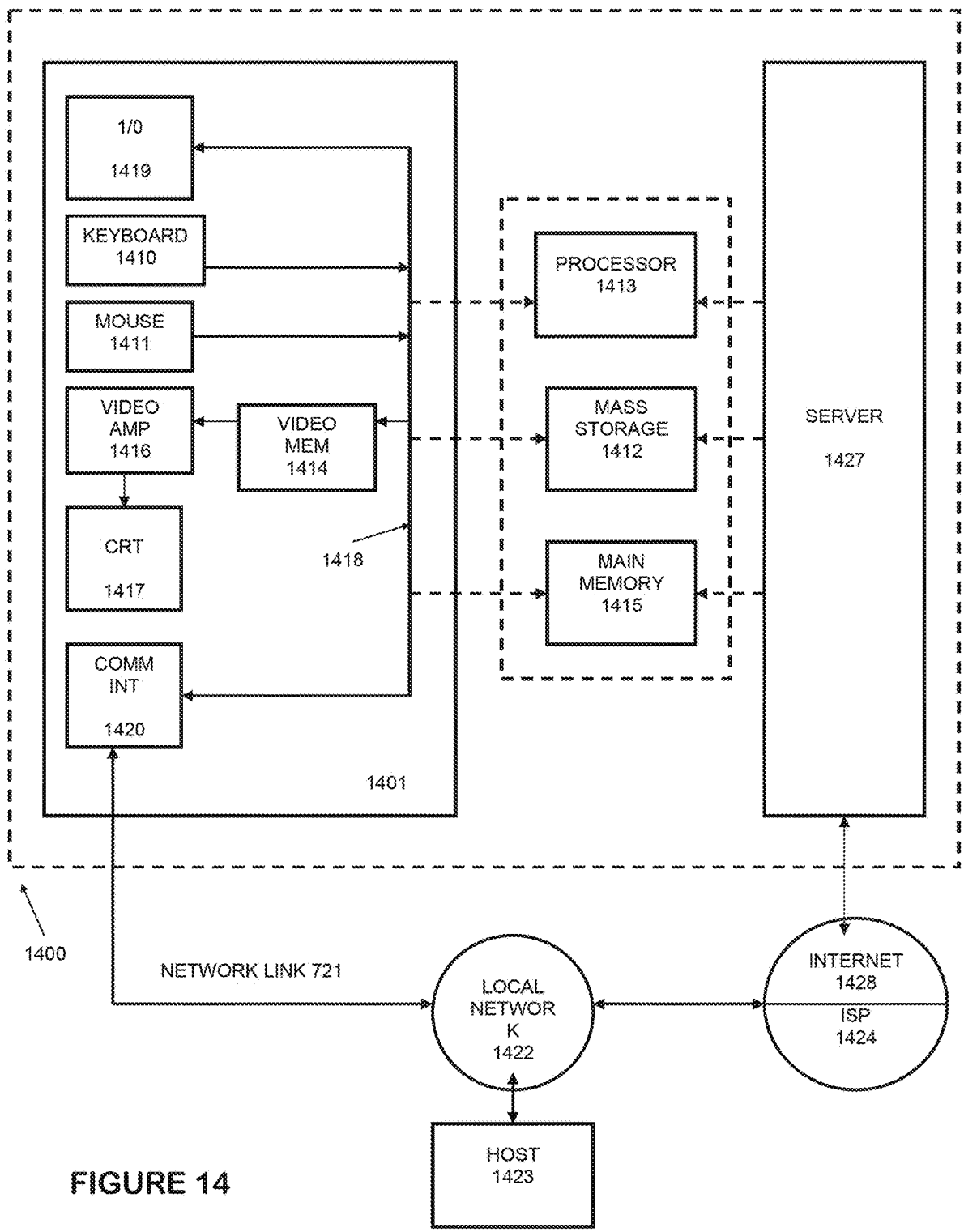
FIG. 14 is an example processing system that can be used in an embodiment.

FIG. 14 illustrates an exemplary a system 1400 that may implement the system. The electronic system 1400 of some embodiments may be a mobile apparatus. The electronic system includes various types of machine readable media and interfaces. The electronic system includes a bus 1405, processor(s) 1414, read only memory (ROM) 1415, input device(s) 1420, random access memory (RAM) 1425, output device(s) 1430, a network component 1435, and a permanent storage device 1440.

The bus 1405 communicatively connects the internal devices and/or components of the electronic system. For instance, the bus 1405 communicatively connects the processor(s) 1410 with the ROM 1415, the RAM 1425, and the permanent storage 1440. The processor(s) 1410 retrieve instructions from the memory units to execute processes of the invention.

The processor(s) 1410 may be implemented with one or more general-purpose and/or special-purpose processors. Examples include microprocessors, microcontrollers, DSP processors, and other circuitry that can execute software. Alternatively, or in addition to the one or more general-purpose and/or special-purpose processors, the processor may be implemented with dedicated hardware such as, by way of example, one or more FPGAs (Field Programmable Gate Array), PLDs (Programmable Logic Device), controllers, state machines, gated logic, discrete hardware components, or any other suitable circuitry, or any combination of circuits.

Many of the above-described features and applications are implemented as software processes of a computer programming product. The processes are specified as a set of instructions recorded on a machine readable storage medium (also referred to as machine readable medium). When these instructions are executed by one or more of the processor(s) 1410, they cause the processor(s) 1410 to perform the actions indicated in the instructions.

Furthermore, software shall be construed broadly to mean instructions, data, or any combination thereof, whether referred to as software, firmware, middleware, microcode, hardware description language, or otherwise. The software may be stored or transmitted over as one or more instructions or code on a machine-readable medium. Machine-readable media include both computer storage media and communication media including any medium that facilitates transfer of a computer program from one place to another. A storage medium may be any available medium that can be accessed by the processor(s) 1410. By way of example, and not limitation, such machine-readable media can comprise RAM, ROM, EEPROM, CD-ROM or other optical disk storage, magnetic disk storage or other magnetic storage devices, or any other medium that can be used to carry or store desired program code in the form of instructions or data structures and that can be accessed by a processor. Also, any connection is properly termed a machine-readable medium. For example, if the software is transmitted from a website, server, or other remote source using a coaxial cable, fiber optic cable, twisted pair, digital subscriber line (DSL), or wireless technologies such as infrared (IR), radio, and microwave, then the coaxial cable, fiber optic cable, twisted pair, DSL, or wireless technologies such as infrared, radio, and microwave are included in the definition of medium. Disk and disc, as used herein, include compact disc (CD), laser disc, optical disc, digital versatile disc (DVD), floppy disk, and Blu-ray® disc where disks usually reproduce data magnetically, while discs reproduce data optically with lasers. Thus, in some aspects machine-readable media may comprise non-transitory machine-readable media (e.g., tangible media). In addition, for other aspects machine-readable media may comprise transitory machine-readable media (e.g., a signal). Combinations of the above should also be included within the scope of machine-readable media.

Also, in some embodiments, multiple software inventions can be implemented as sub-parts of a larger program while remaining distinct software inventions. In some embodiments, multiple software inventions can also be implemented as separate programs. Any combination of separate programs that together implement a software invention described here is within the scope of the invention. In some embodiments, the software programs, when installed to operate on one or more electronic systems 1400, define one or more specific machine implementations that execute and perform the operations of the software programs.

The ROM 1415 stores static instructions needed by the processor(s) 1410 and other components of the electronic system. The ROM may store the instructions necessary for the processor(s) 1410 to execute the processes provided by the system. The permanent storage 1440 is a non-volatile memory that stores instructions and data when the electronic system 1400 is on or off. The permanent storage 1440 is a read/write memory device, such as a hard disk or a flash drive. Storage media may be any available media that can be accessed by a computer. By way of example, the ROM could also be EEPROM, CD-ROM or other optical disk storage, magnetic disk storage or other magnetic storage devices, or any other medium that can be used to carry or store desired program code in the form of instructions or data structures and that can be accessed by a computer.

The RAM 1425 is a volatile read/write memory. The RAM 1425 stores instructions needed by the processor(s) 1410 at runtime, the RAM 1425 may also store the real-time video or still images acquired by the system. The bus 1405 also connects input and output devices 1420 and 1430. The input devices enable the user to communicate information and select commands to the electronic system. The input devices 1420 may be a keypad, image capture apparatus, or a touch screen display capable of receiving touch interactions. The output device(s) 1430 display images generated by the electronic system. The output devices may include printers or display devices such as monitors.

The bus 1405 also couples the electronic system to a network 1435. The electronic system may be part of a local area network (LAN), a wide area network (WAN), the Internet, or an Intranet by using a network interface. The electronic system may also be a mobile apparatus that is connected to a mobile data network supplied by a wireless carrier. Such networks may include 3G, HSPA, EVDO, and/or LTE.

It is understood that the specific order or hierarchy of steps in the processes disclosed is an illustration of exemplary approaches. Based upon design preferences, it is understood that the specific order or hierarchy of steps in the processes may be rearranged. Further, some steps may be combined or omitted. The accompanying method claims present elements of the various steps in a sample order, and are not meant to be limited to the specific order or hierarchy presented.

The various aspects of this disclosure are provided to enable one of ordinary skill in the art to practice the present invention. Various modifications to exemplary embodiments presented throughout this disclosure will be readily apparent to those skilled in the art, and the concepts disclosed herein may be extended to other apparatuses, devices, or processes. Thus, the claims are not intended to be limited to the various aspects of this disclosure, but are to be accorded the full scope consistent with the language of the claims. All structural and functional equivalents to the various components of the exemplary embodiments described throughout this disclosure that are known or later come to be known to those of ordinary skill in the art are expressly incorporated herein by reference and are intended to be encompassed by the claims. Moreover, nothing disclosed herein is intended to be dedicated to the public regardless of whether such disclosure is explicitly recited in the claims. No claim element is to be construed under the provisions of 35 U.S.C. § 18(f) unless the element is expressly recited using the phrase "means for" or, in the case of a method claim, the element is recited using the phrase "step for."

What is claimed is:

1. A method of providing a campaign for a brand comprising:
   in a processing system;
   acquiring, by one or more processors and from the brand, product information and a plurality of brand conversion tasks that are required to be included in each marketing message associated with the campaign, wherein acquiring comprises acquiring via one or more of, an Application Programming Interface (API), scraping a brand site, a brand dashboard, via manual entry, or via a product feed, wherein each of the plurality of brand conversion tasks correspond to data entry and/or data selection steps that are required to complete a financial transaction with the brand;
   identifying, by the one or more processors, a plurality of system conversion tasks that correspond to the plurality of brand conversion tasks based at least in part on a knowledgebase having conversion task identifiers and optimized distributable conversion tasks for each type of conversion task;
   automatically normalizing, by the one or more processors, the product information and the plurality of brand conversion tasks to convert the product information and the plurality of brand conversion tasks to a plurality of distributable system conversion tasks that together enable a user to complete a financial transaction via interaction with a marketing message;
   receiving, by the one or more processors, offer metrics, financial data, and metadata from the brand;
   using, by the one or more processors, a machine learning module to analyze the financial data and metadata to identify and define fields and categories of products of the brand, determine a plurality of products in the fields and categories of the brand that would generate optimized conversion rates;
   automatically generating, by the one or more processors, a plurality of marketing messages associated with the campaign for a plurality of products in the fields and categories for the brand that would generate optimized conversion rates, each of the generated marketing messages comprising the plurality of distributable system conversion tasks;
   generating, by the one or more processors, a priority score based on the offer metrics and an expected amount of compensation based on estimated conversion rates associated with the plurality of generated marketing messages and an offered compensation per conversion, wherein the priority score is based on a number and frequency of historical conversions associated with the brand, conversion types, compensation offered by the brand to a system, and conversion history and offered compensation of other brands, wherein the priority score represents an effort that that will use to promote the campaign and wherein the priority score is a percentile from 0 to 100 that represents a percentage of other brands promoted by the system that will have better results than the brand;
   presenting, by the one or more processors, the priority score to the brand, wherein the brand determines an amount to spend on the plurality of generated marketing messages based on the priority score;
   winning a bid to publish a generated marketing message associated with the campaign, and
   promoting and publishing, by the one or more processors, one or more of the generated marketing messages associated the campaign after winning the bid based on the priority score.

2. The method of claim 1 wherein the offer metric comprises a commission for a sale made from a marketing message.

3. The method of claim 1 further comprising, acquiring marketing message information from the brand, wherein the marketing message information comprises one or more of: data about the brand, products of the brand, customers of the brand, purchase history of the customers, creatives of the brand, audience of the brand, customer offers of the brand, and commission offers.

4. The method of claim 1 wherein the brand is one or more of a merchant, a user, a publisher, or a third party.

5. The method of claim 1 wherein the plurality of generated marketing messages comprise one or more of: an image and an engageable call-to-action.

6. The method of claim 1 further including prioritizing individual ones of the plurality of generated marketing messages by:
   acquiring information on a publishing medium;
   analyzing and comparing a strength of each of a pool of marketing messages and any acquired information to generate a general priority score for each marketing messages available to be displayed in the publishing medium; and ranking the each of the marketing messages by its general priority score.

7. The method of claim 3 wherein acquiring marketing message information occurs via an API, internal databases with stored information, and/or a 3rd party, and wherein the marketing message information includes information about an associated device, a user, and/or a publishing location.

8. The method of claim 6 wherein the publishing medium is an ad, email, social media, website placement, and/or AR/VR.

9. The method of claim 6 wherein the analyzing and comparing occurs automatically via algorithm, and/or automatically via machine learning.

10. The method of claim 6 wherein the strength is based on a likelihood that the user will engage, and/or a payment amount that the system will receive by displaying a marketing message of the pool of marketing messages.

11. The method of claim 6 further including displaying a marketing message of the pool of marketing messages with a highest ranked general priority score in the publishing medium.

12. The method of claim 6 further including returning data and information to the brand and/or owner of the publishing medium.

13. The method of claim 12 wherein the returning of data and information occurs via an API, a user interface, and/or a report.

14. The method of claim 13 wherein the data and information includes information on the marketing message of the pool of marketing messages, a user, engagement between the user and the marketing message, and/or any information provided by the user in the course of engaging with the message.

* * * * *